No. 883,212. PATENTED MAR. 31, 1908.
G. W. LINGLE.
SPIRIT LEVEL.
APPLICATION FILED APR. 9, 1906.
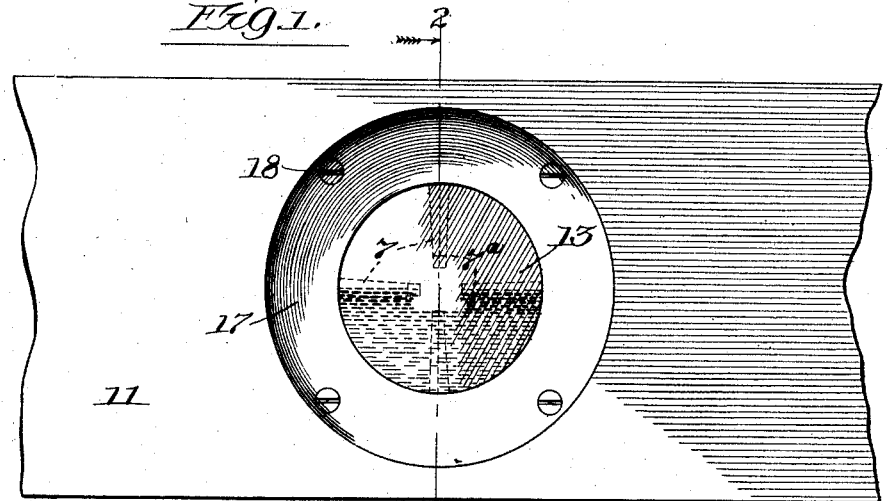
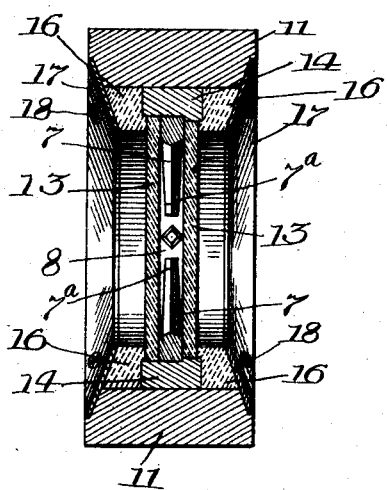
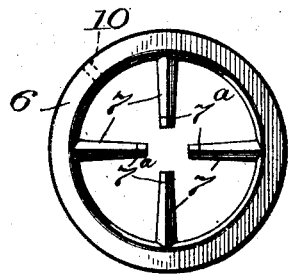
Witnesses:
Inventor:
George W. Lingle.
By Clarence W. Taylor.
Atty.

UNITED STATES PATENT OFFICE.

GEORGE W. LINGLE, OF CHICAGO, ILLINOIS.

SPIRIT-LEVEL.

No. 883,212.  Specification of Letters Patent.  Patented March 31, 1908.

Application filed April 9, 1906. Serial No. 310,717.

*To all whom it may concern:*

Be it known that I, GEORGE W. LINGLE, a citizen of the United States, residing at Chicago, in the county of Cook and State of Illinois, have invented certain new and useful Improvements in Spirit-Levels, of which the following is a specification.

This invention relates to new and useful improvements in spirit levels, and has for its objects, first, to provide a liquid measuring instrument adapted to maintain the upper surface of the liquid in more than one plane at the time of reading; second, to facilitate a condition of rest of the upper surface of the liquid and increase the promptitude of the instrument in furnishing indications of the variations, if any, from the true level or the plumb line; third, to produce a one-glass, reversible spirit level to obviate thought or care which edge or end should be used on the work; and, forth, to provide one or more fixed reading bars in the liquid chamber.

With these and other objects in view my invention consists of the novel features and combination and arrangement of parts hereinafter more fully described, illustrated in the drawings, and particularly pointed out in the claims.

In describing the invention in detail reference is had to the accompanying drawings forming a part of this specification, wherein like numerals of reference indicate corresponding parts throughout the several views and in which Figure 1 is a side elevation of a level embodying the features of my invention, with a part of each end of the stock broken away. Fig. 2 is a vertical section on line 2—2 of Fig. 1. Fig. 3 is a side elevation of the ring with reading bars.

Referring to the drawings by reference numerals, 6 is a ring with reading bars 7 extending inwardly therefrom to near the center thereof.

In Figs. 1, 2 and 3 a circular form is shown, but I do not wish to be limited to this form.

In Fig. 2 I have shown the ring (Fig. 3) assembled between plates 13, 13 to form a liquid container. These plates, preferably, are transparent, through which the action of the liquid can be observed from either side of the level.

For the purpose of introducing any suitable liquid, such as ether, there is a filling hole 10 through the body of the ring 6 into the interior 8 of the container.

In Figs. 1 and 2 the numeral 11 represents a stock or holder of the level with the usual straight edges for the purpose of ascertaining the level and the plumb line. At the center of the stock is a circular liquid container in an adjusting ring 14 which is suitably fastened in the stock by plaster of paris 16, and metal disks 17 secured with screws 18.

Preferably I make the reading bars integral with the body of the ring 6 and extending inwardly therefrom. On the reading bars 7, near the inner end of each, there is a circumferential groove $7^a$ for the purpose of affording a line to assist in reading. This groove on each bar affords a vertical line at the time of reading, and the ends of the bubble-like formation of the upper surface of the liquid at the time of reading will be substantially vertical. The amount of deflection, if any, from the true level or the plumb line is determined by comparing the ends of the lower plane of the liquid with the circumferential groove near the inner end of the two reading bars at the time of reading. No special form of groove is required.

In operation to assemble the respective parts the lateral surfaces of the ring are coated with any suitable cement such as is used to cement glass to metal, and then the plates 13, 13 are placed against the cement coated surfaces and allowed to set. It will be noticed the side plates 13, 13 are close to the reading bars 7. Clearly the restraint of capillary action and the adhesion of liquid to solid between the outer surface of the reading bars and the inner surface of the plates 13, 13 will facilitate a condition of rest of the upper line of the liquid and increase the promptitude of the instrument in furnishing indications of the variations, if any, from the true level or the plumb line. By reason of the nearness of the bars to the plates there is afforded a thin passage between the two and the liquid will take a position in more than one plane at the time of reading. It may be said the reading of the level is by observing the ends of the liquid above the lower plane and comparing these ends with the circumferential groove on the reading bars.

Many changes might be made in the general form and arrangement of the parts described without departing from my invention, and, therefore, I do not restrict myself to the precise details set forth, but consider myself at liberty to make such changes and alterations as fairly come within the spirit and scope of my invention.

Having thus fully described my invention, what I claim as new, and desire to secure by Letters Patent, is:

1. A spirit level comprising a ring and side plates arranged to constitute a liquid container, a liquid, and means extending to near the center of the container and coöperating with a transparent side thereof for holding the upper surface of the liquid in more than one plane at the time of reading.

2. A spirit level comprising a ring and side plates arranged to constitute a liquid container, a liquid, and a reading bar close to one of the plates with a thin passage therebetween for the employment of capillary attraction to maintain the liquid in more than one plane at the time of reading.

3. A spirit level comprising a ring and side plates arranged to constitute a liquid container, a liquid, and a plurality of reading bars close to the plates for the purpose of holding the upper surface of the liquid in more than one plane at the time of reading.

4. A spirit level comprising a ring and transparent side plates arranged to constitute a liquid container, a liquid, and a plurality of reading bars extending inwardly from the ring to near the center thereof and adapted to maintain the upper surface of the liquid in more than one plane at the time of reading.

5. In a spirit level the combination of a ring having a plurality of reading bars extending inwardly therefrom with a transparent plate on each side of the ring.

6. In a spirit level the combination of a ring having a plurality of reading bars extending inwardly therefrom to near the center thereof, a transparent plate on each side of the ring close to the reading bars, a liquid and a stock.

In testimony whereof I affix my signature in presence of two witnesses.

GEORGE W. LINGLE.

Witnesses:
S. ELRA KELLOGG,
JUSTIN H. HILL.